United States Patent
Mielke

Patent Number: 5,762,038
Date of Patent: Jun. 9, 1998

[54] ARRANGEMENT OF PISTON AND CONNECTING ROD FOR INTERNAL COMBUSTION ENGINES

[75] Inventor: Siegfried Mielke, Neckarsulm, Germany

[73] Assignee: Kolbenschmidt AG, Neckarsulm, Germany

[21] Appl. No.: 776,383

[22] PCT Filed: May 31, 1996

[86] PCT No.: PCT/EP96/02349

§ 371 Date: May 8, 1997

§ 102(e) Date: May 8, 1997

[87] PCT Pub. No.: WO96/38683

PCT Pub. Date: Dec. 5, 1996

[30] Foreign Application Priority Data

Jun. 2, 1995 [DE] Germany ............... 195 19 730.5

[51] Int. Cl.$^6$ .............. F02B 75/26; F02F 3/22
[52] U.S. Cl. .............. 123/193.6; 92/208
[58] Field of Search .............. 123/193.6, 197.3; 92/208

[56] References Cited

U.S. PATENT DOCUMENTS

| | | | |
|---|---|---|---|
| 3,765,307 | 10/1973 | Neel, Jr. ............... | 92/208 |
| 4,207,779 | 6/1980 | Papst ............... | 123/197.3 |
| 4,635,596 | 1/1987 | Nakano et al. ............... | 123/197.3 |
| 5,081,967 | 1/1992 | Kemnitz et al. ............... | 92/208 |
| 5,094,195 | 3/1992 | Gonzalez ............... | 123/197.3 |
| 5,560,332 | 10/1996 | Chang ............... | 123/197.3 |

FOREIGN PATENT DOCUMENTS

| | | | |
|---|---|---|---|
| 4016723A1 | 11/1991 | Germany . | |
| 4133586 | 12/1992 | Germany ............... | 123/197.3 |
| 58-68545 | 4/1983 | Japan . | |
| 58-68547 | 4/1983 | Japan . | |
| 840015 | 7/1960 | United Kingdom . | |

*Primary Examiner*—David A. Okonsky
*Attorney, Agent, or Firm*—Jones, Tullar & Cooper, P.C.

[57] ABSTRACT

A piston and connecting rod arrangement for internal combustion engines, including an upper piston part, a lower piston part and a connecting rod with a spherical connecting rod end. The spherical connecting rod end defines an upper spherical segment and a lower spherical segment, and a recess having a snoutlike cross section. The spherical connecting rod end is slidingly supported with the upper spherical segment in the spherical segmental indentation, and the recess is situated between the upper spherical segment and the lower spherical segment.

26 Claims, 2 Drawing Sheets

5,762,038

ARRANGEMENT OF PISTON AND CONNECTING ROD FOR INTERNAL COMBUSTION ENGINES

BACKGROUND OF THE INVENTION

The present invention relates to a piston and connecting rod arrangement for internal combustion engines having: an upper piston part including a piston bottom, a fire land and a ring land; a lower piston part which forms the shaft; and a spherical connecting rod end. The spherical connecting rod end is slidingly supported with an upper spherical segment in a spherical-segmental indentation in the underside of the piston bottom, and with a lower spherical segment surrounding a connecting rod in a spherical-layer-like indentation of a retaining ring connected to the inside of the piston shaft.

Piston and connecting rod arrangements of this kind are distinguished by good rectilinear guidance of the piston, a comparatively short piston shaft, an absolutely axially symmetrical thermal expansion, and little play between the piston and the cylinder travel path.

German published Patent Application DE A 4 016 723 describes a piston and connecting rod arrangement for internal combustion engines that comprises a cast aluminum alloy piston with and upper and lower part and a ball-like connecting rod end.

On the side remote from the connecting rod, in a spherical-segmental indentation of the underside of the piston bottom and in the region bordering the connecting rod, the connecting rod end is supported in a swivel-bearing-like retaining ring that is detachably connected to the piston shaft and comprises two halves that are joined together by cotter pins. Located on the outer circumference of the retaining ring, in its lower portion and immediately opposite above the bottleneck of the piston shaft, is a turned groove, which is provided with a thread on the side of the piston shaft. A threaded ring is rotated into the hollow-cylindrical recess formed by the turned groove, in such a way that the retaining ring is braced against the collar cast onto the inside of the piston shaft. Producing the piston and connecting rod arrangement requires joining together multiple components that are manufactured to close tolerances with joining fits.

SUMMARY OF THE INVENTION

It is an object of the present invention to furnish a piston and connecting rod arrangement of the type referred to at the outset in which the mechanical structure of the joining parts is easy to assemble and in which these parts can be assembled in only a few assembly operations.

This object is attained according to the present invention by providing a recess of a snoutlike cross section which is mounted between the upper and lower spherical segments and/or in that one or more flats are provided between the upper and lower spherical segments of the connecting rod end.

Particularly as a result of the embodiment according to the present invention of the connecting rod end, the effort and expense of assembly for producing the piston and connecting rod arrangement is markedly reduced; the demands for tolerances and tight fits can be comparatively lower. Moreover, a marked reduction in weight is attained by means of the recessing and flattening of the connecting rod end.

The insertion of the connecting rod into the piston is made easier in that the axes of symmetry of the connecting rod end and connecting rod are preferably offset from and parallel to one another, and/or the diameter of the smaller opening of the retaining ring connected to the piston shaft is manufactured larger in at least one sector than in the remaining circumferential region.

In terms of further details of the embodiment of the piston and connecting rod arrangement, the piston is joined together from an upper part and a lower part, which are connected by soldering, welding, shrinkage, screwing, adhesive bonding, or the like; expediently, the bearing faces for the connecting rod end and the fitting surfaces of the piston components undergo their final machining prior to the joining operation.

The upper part of the piston can include the fire land, ring land, piston bottom, and the upper portion of the piston shaft. To make it possible to reach the connecting rod end after its installation in the piston, it may be appropriate that the piston shaft is provided at least with one opening in the region of the spherical-segmental indentation in the underside of the piston bottom and the larger opening of the retaining ring. A particular feature of the piston and connecting rod arrangement is considered to be that parts of the connecting rod end and/or parts of the upper portion of the connecting rod are guided positively in the piston.

Parts of the connecting rod end and/or parts of the upper portion of the connecting rod are guided positively in the piston, at deflection angles of the kind brought about by the crankshaft in engine operation; in terms of their spatial extent, the nature of the guide elements is such that upon major deflections of the connecting rod, of the kind that can be purposefully established in the installation of the connecting rod and piston, a relative rotation of the connecting rod and the piston to one another is possible.

In another characteristic of the present invention, the cross section of the connecting rod in the transition region to the connecting rod end has a ratio of width to height other than 1.

It may be advantageous to join together the connecting rod end from a plurality of detachable components.

BRIEF DESCRIPTION OF THE DRAWINGS

The present invention is shown by way of example in the drawing and will be described in further detail below. Shown are.

DETAILED DESCRIPTION OF THE PREFERRED EMBODIMENT

Figure 1:
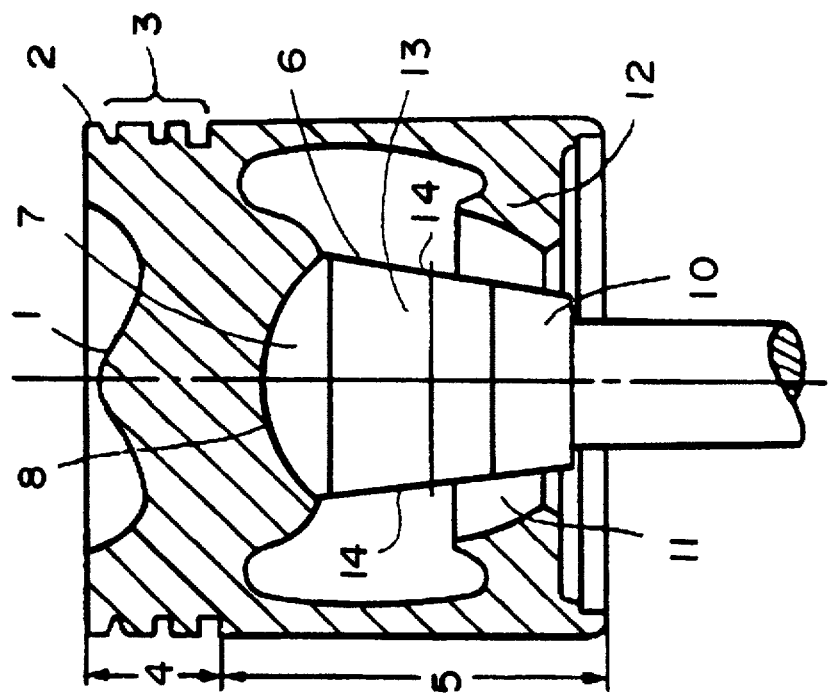
FIG. 1, a longitudinal section through the piston and connecting rod arrangement along a plane that includes the piston axis and the connecting rod swiveling plane.
Figure 2:
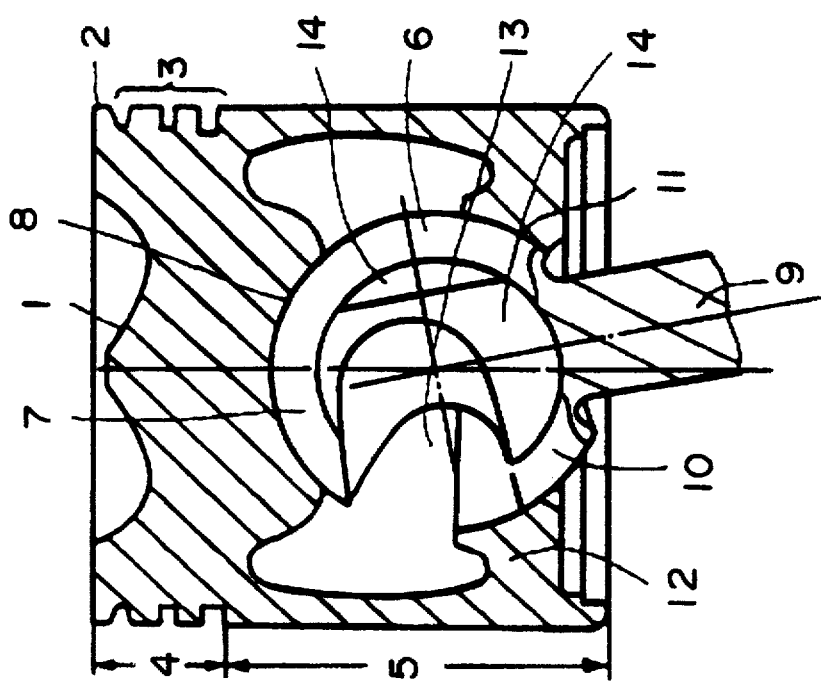
FIG. 2, a longitudinal section through the piston and connecting rod arrangement along the plane that includes the piston axis and the plane perpendicular to the connecting rod swiveling plane.

The piston comprises an upper piston part, which includes the piston bottom 1, the fire land 2 and the ring land 3, and the lower piston part, which forms the piston shaft 5. A connecting rod end 6 in the form of a spherical layer is supported in the piston, which is cast from aluminum piston alloy. The upper spherical segment 7 of the connecting rod end is supported in a spherical-segmental indentation 8 in the underside of the piston bottom 1. The lower spherical segment 10 of the connecting rod end 6 that surrounds the connecting rod 9 is supported in a spherical-layer-like indentation 11 of a retaining ring 12 that is cast integral with the inside of the piston shaft 5. The connecting rod end 6 is provided with a U-shaped recess 13 on one side, between the upper spherical segment 7 and the lower spherical segment 10. On both sides of the connecting rod swiveling plane, the connecting rod end 6 has flats 14 inclined from top to bottom relative to the connecting rod axis.

Figure 3:
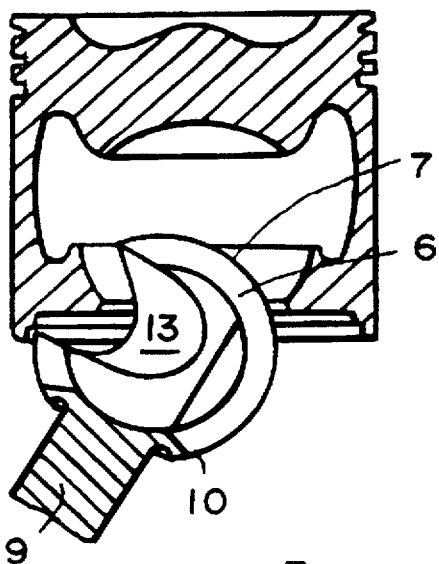
FIGS. 3–7 shows the steps for installing the connecting rod into the piston.
Figure 4:
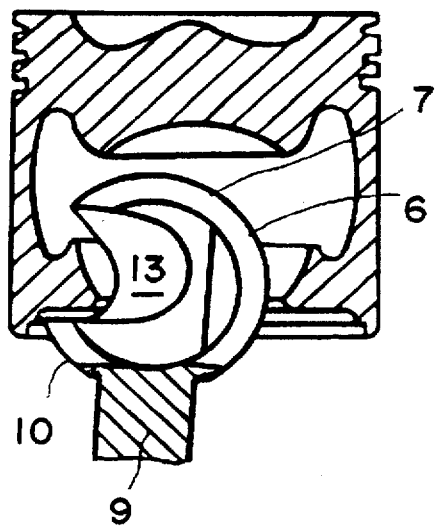
Figure 5:
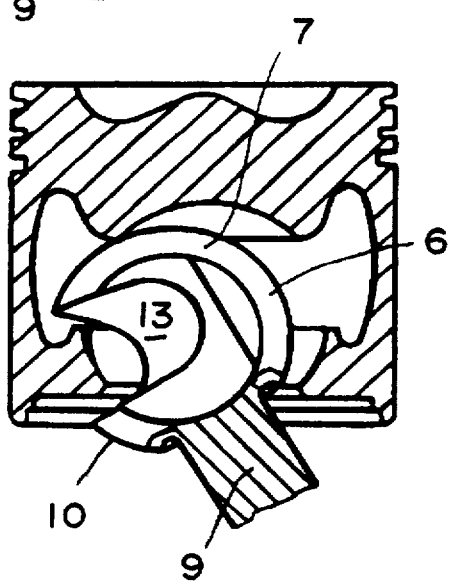
Figure 6:
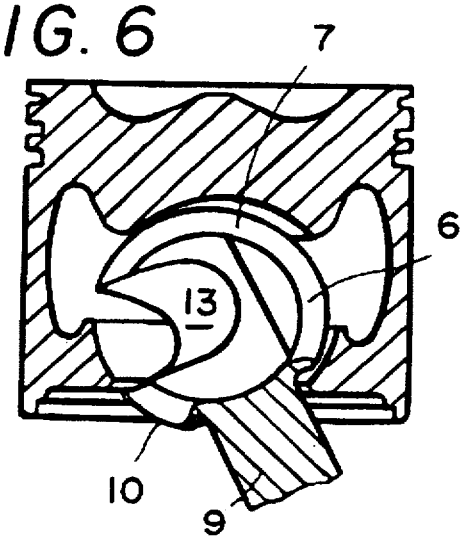
Figure 7:
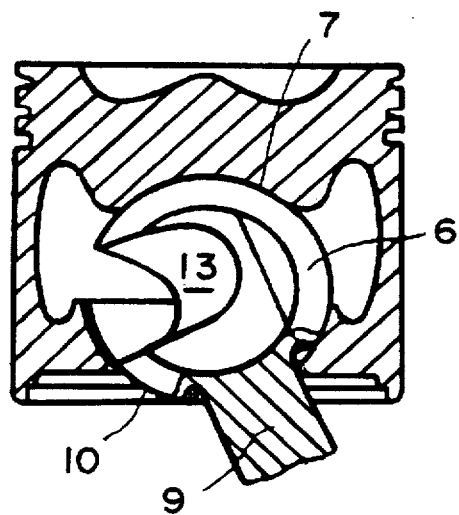

In FIGS. 3–7, several method steps are shown for installing the connecting rod end 6 in the piston. In them, with the recess 13 of U-shaped cross section mounted between the upper and lower spherical segments 7, 10, the connecting rod end 6 is pushed into the retaining ring 12 by rocking the connecting rod 9. The connecting rod 9 is then rocked far enough toward the other side that the recess 13 pushes to a greater depth onto the retaining ring 12. By rocking the connecting rod some more, the connecting rod end 6 can then be inserted into the interior of the piston. By swiveling the connecting rod back into the vertical position, the installed position of the connecting rod end 6 is achieved.

I claim:

1. A piston and connecting rod arrangement for internal combustion engines, comprising:
   an upper piston part including a piston bottom, a fire land and a ring land;
   a lower piston part which forms a shaft, said lower piston part defining a spherical-segmental indentation formed by the underside of said piston bottom and a retaining ring forming a spherical-layer-like indentation;
   a spherical connecting rod end, defining an upper spherical segment and a lower spherical segment, and a recess having a snoutlike cross section; and
   a connecting rod, connected to said lower segment of said connecting rod end and extending therefrom,
   wherein said spherical connecting rod end is slidingly supported with said upper spherical segment in said spherical-segmental indentation and said lower spherical segment in said retaining ring, and
   said recess is situated between said upper spherical segment and said lower spherical segment.

2. The piston and connecting rod arrangement as defined in claim 1, wherein said recess extends over the entire circumference of said lower piston part.

3. The piston and connecting rod arrangement as defined in claim 1, wherein said recess extends over part of the circumference of said lower piston part.

4. The piston and connecting rod arrangement as defined in claim 3, further comprising:
   a further recess on the side opposite to a projection plane that includes the axis of symmetry of said connecting rod end.

5. The piston and connecting rod arrangement as defined in claim 1, wherein said connecting rod end defines an axis of symmetry, and a plane is defined which extends perpendicular to said axis of symmetry and through the center point of said connecting rod end, and wherein said recess is located on both sides of said plane.

6. The piston and connecting rod arrangements as defined in claim 5, wherein a majority of said recess is located below said plane.

7. The piston and connecting rod arrangement as defined in claim 6, wherein more than 55% of said recess is located below said plane.

8. The piston and connecting rod arrangement as defined in claim 1, wherein said connecting rod end defines an axis of symmetry and a center point, and wherein an arrow oriented from the center point of said connecting rod end to the lowermost point of said recess is essentially perpendicular to the axis of symmetry of said connecting rod end.

9. The piston and connecting rod arrangement as defined in claim 1, wherein said connecting rod end defines an axis of symmetry and said connecting rod defines an axis of symmetry, and wherein said axes of symmetry are offset from and parallel to one another.

10. The piston and connecting rod arrangement as defined in claim 1, wherein said retaining ring defines two openings of different diameters, and wherein the opening of smaller diameter is embodied as larger in at least one sector than in the remaining circumferential region.

11. The piston and connecting rod arrangement as defined in claim 1, wherein said retaining ring defines a bearing face, and wherein the axial height of said bearing face is less than the axial height of said recess.

12. The piston and connecting rod arrangement as defined in claim 1, wherein said retaining ring defines a bearing face, and wherein the axial height of said bearing face is equal to the axial height of said recess.

13. The piston and connecting rod arrangement as defined in claim 1, wherein said upper piston part and said lower piston part are joined together by one of soldering, welding, shrinkage, screwing, adhesive bonding and the like.

14. The piston and connecting rod arrangement as defined in claim 1, wherein said connecting rod end defines bearing faces, and wherein these faces and the fitting surfaces of the piston are final-machined prior to the components bearing joined.

15. The piston and connecting rod arrangement as defined in claim 1, wherein said retaining ring defines two openings of different diameters, and wherein said lower piston part includes at least one opening in the region of said spherical-segmental indentation and said larger opening of said retaining ring.

16. The piston and connecting rod arrangement as defined in claim 1, wherein parts of said connecting rod end are guided positively in said lower piston part.

17. The piston and connecting rod arrangement as defined in claim 16, wherein the guiding occurs at deflection angles brought about by the crankshaft during engine operation, and wherein a relative rotation of said connecting rod and said lower piston part occurs during major deflections of said connecting rod, which are of the kind that can be purposefully established in the installation of said connecting rod to said lower piston part.

18. The piston and connecting rod arrangement as defined in claim 1, wherein parts of said connecting rod end and parts of upper portions of said connecting rod are guided positively in said lower piston part.

19. The piston and connecting rod arrangement as defined in claim 18, wherein the guiding occurs at deflection angles brought about by the crankshaft during engine operation, and wherein a relative rotation of said connecting rod and said lower piston part occurs during major deflections of said connecting rod, which are of the kind that can be purposefully established in the installation of said connecting rod to said lower piston part.

20. The piston and connecting rod arrangement as defined in claim 1, wherein parts of the upper portion of said connecting rod are guided positively in said lower piston part.

21. The piston and connecting rod arrangement as defined in claim 20, wherein the guiding occurs at deflection angles brought about by the crankshaft during engine operation, and wherein a relative rotation of said connecting rod and said lower piston part occurs during major deflections of said connecting rod, which are of the kind that can be purposefully established in the installation of said connecting rod to said lower piston part.

22. The piston and connecting rod arrangement as defined in claim 1, wherein the cross section of said connecting rod in the transition region leading to said connecting rod end has a ratio of width to height other than 1.

23. The piston and connecting rod arrangement as defined in claim 1, wherein said connecting rod end is detachable from said lower piston part.

24. A unitarily formed piston with an upper piston and a lower piston part with a connecting rod arrangement for internal combustion engines, comprising:

the upper piston part including a piston bottom, a fire land and a ring land;

the lower piston part which forms a shaft, said lower piston part including a spherical-segmental indentation formed by the underside of said piston bottom, and a retaining ring forming a spherical-layer-like indentation;

a spherical connecting rod end, defining an upper spherical segment and a lower spherical segment, and one or more flats situated between said upper spherical segment and said lower spherical segment; and a connecting rod connected to said lower spherical segment of said connecting rod end and extending therefrom, wherein said spherical connecting rod end is slidingly supported with said upper spherical segment in said spherical-segmental indentation and said lower spherical segment in said retaining ring and wherein said lower spherical segment is surrounded by the retaining ring.

25. The piston and connecting rod arrangement as defined in claim 24, wherein said connecting rod end defines an axis of symmetry, and wherein said flats extends parallel to axis of symmetry of said connecting rod end.

26. The piston and connecting rod arrangement as defined in claim 24, wherein said connecting rod end defines an axis of symmetry, and wherein said flats are inclined relative to the axis of symmetry of said connecting rod end.

\* \* \* \* \*